United States Patent Office 2,849,442
Patented Aug. 26, 1958

2,849,442

PRODUCTION OF ORGANIC ACID ESTERS OF CELLULOSE IN HOMOGENEOUS SOLUTION WITH SUBSEQUENT MULTIPLE PHASE EXTRACTION

Henry W. Steinmann, Madison, N. J., assignor to Celanese Corporation of America, New York, N. Y., a corporation of Delaware No Drawing. Application November 23, 1954
Serial No. 470,825

22 Claims. (Cl. 260—230)

This invention relates to the production of organic acid esters of cellulose and relates more particularly to an improved process for the production of organic acid esters of cellulose by the homogeneous or solution process.

In my copending application, Serial No. 443,957, filed July 16, 1954, I have described the production of organic acid esters of cellulose by esterifying cellulose with an organic acid anhydride in the presence of an esterification catalyst and a water-immiscible solvent for the cellulose ester being formed. At the completion of the esterification there is obtained a substantially homogeneous esterification solution. This solution may be treated to ripen or partially hydrolyze the organic acid ester of cellulose, if desired. The esterification solution is then extracted with an aqueous medium under such conditions that two phases are present and no precipitation of the organic acid ester of cellulose takes place. The extraction of the esterification solution with an aqueous medium removes from the said solution the organic acid and acid esterification catalyst present therein. The organic acid ester of cellulose solution which is obtained after the extraction is complete may be used directly for spinning. However, it is usually desirable before spinning, to remove from the said solution at least some of the water present therein, as by distillation or with a drying agent. By this process it is possible to obtain a solution of an organic acid ester of cellulose suitable for spinning without the necessity of precipitating the organic acid ester of cellulose as is the case with conventional processes for preparing organic acid esters of cellulose.

When the foregoing process is carried out employing an acid esterification catalyst, particularly perchloric acid, difficulty is experienced in removing all of the perchloric acid from the esterification solution during the extraction step without employing extremely large volumes of the aqueous extraction medium or repeated extractions, or both, which is economically undesirable. Attempts to facilitate the removal of the perchloric acid by neutralizing the same with an alkaline reacting compound of an alkali metal or an alkaline earth metal have not been successful. Apparently, the perchloric acid, or the alkali metal or alkaline earth metal perchlorate formed on neutralization of the perchloric acid, will not pass readily from the esterification solution to the aqueous extraction medium during the extraction step.

It is an important object of this invention to provide a process for the production of organic acid esters of cellulose which will be free from the foregoing and other disadvantages.

A further object of this invention is to provide a process for the production of organic acid esters of cellulose by the homogeneous or solution process in which a solution suitable for spinning may be obtained without any intermediate precipitation of the organic acid ester of cellulose and in which a complete removal of the acid esterification catalyst may be readily achieved.

Other objects of this invention will be apparent from the following detailed description and claims.

According to the present invention, organic acid esters of cellulose are prepared by esterifying cellulose with an organic acid anhydride in the presence of an acid esterification catalyst, such as perchloric acid, and a water-immiscible solvent for the organic acid ester of cellulose being formed whereby there is obtained a substantially homogeneous esterification solution. This solution may then be treated to ripen or partially hydrolyze the organic acid ester of cellulose, if desired. The perchloric acid esterification catalyst is neutralized with a nitrogenous base and the esterification solution is then extracted with an aqueous medium under such conditions that two phases are present and no precipitation of the organic acid ester of cellulose from the solution takes place. Under these conditions it is found that there is a rapid and substantially complete removal of the esterification catalyst during the extraction step to give a solution which may be used directly for spinning. However, as pointed out above, it is usually desirable to remove from the said solution, before spinning, at least some of the water present therein.

Prior to carrying out the esterification the cellulose may advantageously be pretreated, according to the usual practice in the art, to increase its reactivity and thereby shorten the esterification time. Such pretreatment may be effeced by adding to the cellulose small quantities of a lower aliphatic acid such as, for example, formic acid, acetic acid, propionic acid or butyric acid, as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed, in the presence of a water-immiscible solvent for the said ester. Suitable water-immiscible solvents for this purpose include, for example, nitromethane, m-cresol, cyclopentanone, pyrrole, and furfural. Chrlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning. Instead of employing a single material as the solvent, a mixture of materials, such as those specified above, may be used for this purpose. The quantity of solvent may range from the minimum necessary to dissolve the organic acid ester of cellulose being formed to any desired maximum. The use of excessively large quantities of solvent is, however, economically undesirable since it involves an added expense in recovering the solvent. When methylene chloride is employed as the solvent, good results have been obtained with from about 400 to 1400 parts by weight of methylene chloride for each 100 parts by weight of cellulose. The quantity of organic acid anhydride is not critical, good results having been obtained with from about 2.4 to 3.2 moles of organic acid anhydride for each 100 parts by weight of cellulose. The quantity of organic acid anhydride specified is in excess of that required to react with any water which may be introduced into the esterification mixture with the cellulose, the pretreating agent, the water-immiscible solvent or from any other source.

The quantity of acid esterification catalyst, such as perchloric acid, that is present during the esterification process may range from as little as 0.5% by weight, or less, to as much as about 5% by weight, or even more, based on the weight of the cellulose, with smaller quantities of catalyst requiring longer reaction times. The esterification is normally carried out at temperatures of between about 0 to 60° C.

As the esterification proceeds, the organic acid ester of cellulose being formed will dissolve in the esterification mixture so that at the end of the esterification there will be obtained a substantially homogeneous solution. This solution will contain, in addition to the organic acid ester of cellulose and the water-immiscible solvent therefor, the acid esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

The acid esterification catalyst, such as perchloric acid, is neutralized with a nitrogenous base that will react therewith to form an ammonium perchlorate. Suitable nitrogenous bases that may be used for this purpose are ammonia and amines, including aliphatic and aromatic primary, secondary and tertiary amines, as well as amines in which the nitrogen atom forms a part of a heterocyclic ring. Examples of such nitrogenous bases are ammonia, diethylamine, piperidine, quinoline, pyridine, triethylamine, aniline, ethylamine, trimethylamine and dimethylamine. The nitrogenous bases are soluble in the esterification solution and react with the perchloric acid present therein to give ammonium perchlorates which may be substituted or not. On extraction of the esterification solution with an aqueous medium, the ammonium perchlorates enter the aqueous phase readily, showing no tendency to be absorbed or adsorbed by the colloidal or sub-colloidal particles of the organic acid ester of cellulose. The quantity of nitrogenous base that is employed should be at least sufficient to neutralize all of the perchloric acid, quantities providing a 10 to 50% molar excess of the nitrogenous base as compared with the perchloric acid, being preferred. The nitrogenous base may be added to the esterification solution per se, or may be added to the esterification solution together with a sufficient quantity of water to convert all the organic acid anhydride remaining in the said solution to the corresponding organic acid.

For many purposes, it is desirable to ripen or partially hydrolyze the organic acid ester of cellulose to increase the average number of free hydroxyl groups per anhydroglucose unit in the cellulose molecule. Such ripening may be readily carried out by adding sufficient water to the solution to convert any remaining organic acid anhydride to the corresponding acid, together with an excess of water which may range from about 50 to 100 parts by weight for each 100 parts by weight of cellulose. Following the addition of the water, the solution is held, preferably with agitation, until the desired degree of hydrolysis has taken place. The temperature of the solution may be raised to increase the speed of the ripening process. It may also be desirable in some cases to add a quantity of a mineral acid to the solution to accelerate the ripening, or it may be desirable to neutralize all or a portion of the acid esterification catalyst to slow down the ripening. The addition of further quantities of mineral acid to the ripening solution or the neutralization of all or a portion of the acid catalyst therein may be effected at the beginning of the ripening process or after the ripening has proceeded to some extent. If the ripening is carried to the point where there is an appreciable reduction in the number of the ester groups in the organic acid ester of cellulose, it is desirable to add to the ripening solution a small proportion of a water-miscible solvent, such as methanol, ethanol, or the like to avoid the precipitation of the ripened organic acid ester of cellulose from the water-immiscible solvent. In this case, it may also be desirable to have present in the aqueous medium employed for the extraction step, a low percentage of a water-miscible solvent, as set forth below, to prevent the precipitation of the organic acid ester of cellulose.

To effect the partial or complete neutralization of the acid esterification catalyst during the ripening of the organic acid ester of cellulose, there is employed a nitrogenous base as specified above so that the ammonium salt formed on neutralization will be readily removed from the esterification solution during the extraction thereof with an aqueous medium. After the ripening of the organic acid ester of cellulose is complete, a nitrogenous base is added to the esterification solution in an amount at least sufficient to neutralize all the acid esterification catalyst present therein as well as all the mineral acid that may have been added during the ripening step. Preferably, as pointed out above, there is added to the esterification solution an excess of nitrogenous base.

The solution of organic acid ester of cellulose is then subjected to a two-phase extraction with an aqueous medium to remove therefrom the organic acids, salts and other water-soluble substances present therein. During the extraction, the proportion of water-immiscible solvent should be sufficiently high so that no precipitation of the organic acid ester of cellulose from solution will take place. The solution does develop a cloudy appearance during the extraction with an aqueous medium, which cloudiness is probably due to the formation of an emulsion. However, since there is no separation of the organic acid ester of cellulose from the emulsion, it will hereinafter also be referred to as a solution.

The necessary proportion of water-immiscible solvent will depend, among other things, on the concentration of the organic acid ester of cellulose, the amount of organic acid present, the concentration of salts, and the temperature of the solution. For any given set of conditions, the necessary proportion of water-immiscible solvent may be readily ascertained. In some cases, the amount of water-immiscible solvent necessary to avoid precipitation during the extraction may be present in the esterification solution from the very outset. However, this may, in some cases, greatly increase the dilution of the esterification solution above that required for the esterification itself and thereby reduce the quantity of organic acid ester of cellulose that can be prepared in a reactor of given volume. In such cases, it may be desirable to carry on the esterification in the presence of a smaller amount of water-immiscible solvent and then add to the esterification solution, before or after ripening the same, a further quantity of water-immiscible solvent before extracting the solution with an aqueous medium. The addition of a further quantity of water-immiscible solvent also reduces the viscosity of the solution whereby it may be handled more easily and whereby the extraction will proceed more rapidly. When the extraction is carried out without first ripening the organic acid ester of cellulose, the esterification solution will normally have present therein a certain proportion of organic acid anhydride. At the beginning of the extraction this organic acid anhydride will be converted to the corresponding organic acid by reaction with the extraction water brought into contact with the esterification solution if there is present in the esterification solution a mineral acid, which may be the esterification catalyst, to catalyze the reaction between the anhydride and the water. Otherwise, the reaction between the anhydride and the water will proceed at a very slow rate and at least a portion of the anhydride will be extracted as such from the esterification solution.

The aqueous medium employed for the extraction may be water itself. There may also be used a mixture of water and a low percentage of a water-miscible solvent or partially water-miscible solvent such as methanol, ethanol, normal propanol, isopropanol, ethyl acetate, pyridine, acetone and methyl acetate. The addition of the water-miscible solvent offers the advantage that the extraction proceeds more rapidly than when water alone is used as the extractant. However, in this case, the organic acid ester of cellulose solution obtained will contain a certain proportion of the water-miscible solvent which may be undesirable.

The extraction of the esterification solution may be carried out on a batch basis by mixing the said solution with an aqueous medium, permitting the solution to stand whereby it will separate into two phases, and then separating the two phases from contact with each other. This sequence of steps is then repeated as many times as necessary to remove from the esterification solution the water-soluble impurities present therein. Preferably, however, the extraction is carried out in a continuous manner. For example, the esterification solution may be passed through one or more extraction columns into which one or more streams of aqueous medium is introduced and through which the aqueous medium flows concurrent with or countercurrent to the esterification solution. During the extraction the water-soluble impurities that are present in the esterification solution, including organic acids and salts, dissolve in the water and are thereby effectively removed from the said esterification solution. The process of this invention is especially well adapted for use where the extraction is to be carried out in a continuous manner since the degree of agitation achieved during a continuous extraction is relatively mild and the removal of the perchloric acid during such an extraction is therefore difficult.

At the end of the extraction step there is obtained a solution of the organic acid ester of cellulose in the water-immiscible solvent which is free from water-soluble impurities, but which is saturated with water. This solution may be used without further treatment for spinning or other purposes. However, it is preferred to remove from this solution at least a portion of the water present therein, for example, by distilling the same or through the use of a dehydrating agent. With many of the water-immiscible solvents, such as methylene chloride, there will distill over an azeotrope of water and the water-immiscible solvent. It will also usually be desirable to remove a portion of the water-immiscible solvent from the organic acid ester of cellulose solution to increase the concentration of the said solution so that it will be better suited for spinning operations. The removal of a portion of the solvent may be effected without difficulty by distilling the solvent from the solution. In some cases, it may, on the other hand, be preferred to add a further quantity of solvent to the solution to reduce the concentration of the organic acid ester of cellulose therein. The spinning properties of the solution may also be improved by adding thereto a proportion of a second and different solvent. For example, when methylene chloride is the water-immiscible solvent, the spinning properties of the solution may be improved by adding thereto a lower aliphatic alcohol such as methanol, ethanol, normal propanol or isopropanol. There may also be added to the solution pigments, dyes, plasticizers, fire-retardants and other materials capable of altering the appearance or properties of the final products.

It may also be desirable to treat the solution with a decolorizing agent such as activated charcoal, diatomaceous earth or Fuller's earth to remove therefrom color-producing materials. The solution may also be filtered to remove particles therefrom such as bits of unacetylated cellulose, dirt and the like.

The solution of organic acid ester of cellulose obtained in this manner is well suited for spinning by conventional spinning techniques to form filaments, films and the like as well as for coatings and similar purposes. It is free from impurities that would interfere with the spinning operation or impair the properties of the products produced therefrom. Because no precipitation steps are involved in preparing the solutions, important economies can be achieved in such preparation. The organic acid ester of cellulose may, if desired, also be precipitated from such solution by mixing the same with a large excess of a non-solvent for the organic acid ester of cellulose, in which case there will be obtained a product which needs no further purification to prepare it for use.

The process of this invention is generally suited for the production of organic acid ester of cellulose, regardless of their degree of substitution. It is especially well suited for the production of organic acid esters of cellulose having a high degree of substitution such as triesters or cellulose esters having fewer than 0.2 free hydroxyl groups per anhydroglucose unit in the cellulose molecule, since it avoids the difficulties that are normally encountered in preparing such esters by the solution process.

The invention will now be described specifically in connection with the production of cellulose acetate which is commercially the most important organic acid ester of cellulose at the present time. However, it may also be employed for the production of other organic acid esters of cellulose including cellulose propionate, cellulose butyrate, cellulose acetate formate, cellulose acetate propionate, cellulose acetate butyrate and cellulose benzoate.

The following examples are given to illustrate this invention further.

Example I

To 25 parts by weight of wood pulp there is added 8.75 parts of glacial acetic and the whole is stirred for 2 hours. The pretreated wood pulp is then mixed with a solution that has been cooled to 10° C. and contains 70 parts by weight of acetic anhydride, 320 parts by weight of methylene chloride and 0.25 part by weight of perchloric acid. The temperature is controlled at 40° C. and is then reduced to 30° C. with cooling and held at this point for 0.5 hour until a clear, grain free dope is obtained. Sufficient water (5 parts) is then added to the esterification solution to convert the excess acetic anhydride to acetic acid. There is then added to the dope, with good agitation, a 23% molar excess of pyridine to react with the perchloric acid, and the dope is extracted with water in a packed column with countercurrent flow until the dope is free from acetic acid. At this time, the dope is substantially free of perchloric acid. Water is then removed from the solution by azeotropic distillation, sufficient methylene chloride is removed from the solution by distillation to bring its cellulose acetate concentration to 19.5% by weight and the solution is spun to form a multi-filament yarn.

Example II

The process of Example I is repeated, employing a 50% molar excess of diethylamine to react with the perchloric acid. The extracted dope is substantially free of perchloric acid.

Example III

The process of Example I is repeated, employing a 50% molar excess of piperidine to react with the perchloric acid. The extracted dope is substantially free of perchloric acid.

Example IV

The process of Example I is repeated, employing a 50% molar excess of quinoline to react with the perchloric acid. The extracted dope is substantially free of perchloric acid.

Example V

The process of Example I is repeated, employing a 25% aqueous solution of ammonia to furnish water to react with the excess acetic anhydride and also to provide a 50% molar excess of ammonia to react with the perchloric acid. The extracted dope is substantially free of perchloric acid.

Example VI

The process of Example I is repeated, employing a 47% molar excess of magnesium acetate to react with the perchloric acid. The extracted dope contains 73% of the original perchloric acid.

Similar results are obtained when sodium or potassium acetates are substituted for the magnesium acetate.

It is to be understood that the foregoing detailed description is given merely by way of illustration and that many variations may be made therein without departing from the spirit of my invention.

Having described my invention, what I desire to secure by Letters Patent is:

1. In a process for the production of lower aliphatic acid esters of cellulose, the steps which comprise esterifying cellulose with a lower aliphatic acid anhydride in the presence of an acid esterification catalyst and a water-immiscible solvent for the ester being formed whereby there will be obtained at the completion of the esterification a substantially homogeneous solution, neutralizing the acid esterification catalyst with a nitrogeneous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

2. In a process for the production of lower aliphatic acid esters of cellulose, the steps which comprise esterifying cellulose with a lower aliphatic acid anhydride in the presence of an acid esterification catalyst and a water-immiscible solvent for the ester being formed whereby there will be obtained at the completion of the esterification a substantially homogeneous solution, neutralizing the acid esterification catalyst with a 10 to 50% molar excess of a nitrogeneous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

3. In a process for the production of lower aliphatic acid esters of cellulose, the steps which comprise esterifying cellulose with a lower aliphatic acid anhydride in the presence of an acid esterification catalyst and a water-immiscible solvent for the ester being formed whereby there will be obtained at the completion of the esterification a substantially homogeneous solution, neutralizing the acid esterification catalyst with a nitrogenous base selected from the group consisting of ammonia and amines free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

4. In a process for the production of lower aliphatic acid esters of cellulose, the steps which comprise esterifying cellulose with a lower aliphatic acid anhydride in the presence of perchloric acid and a water-immiscible solvent for the ester being formed whereby there will be obtained at the completion of the esterification a substantially homogeneous solution, neutralizing the perchloric acid with a nitrogenous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

5. In a process for the production of lower aliphatic acid esters of cellulose, the steps which comprise esterifying cellulose with a lower aliphatic acid anhydride in the presence of an acid esterification catalyst and a water-immiscible solvent for the ester being formed whereby there will be obtained at the completion of the esterification a substantially homogeneous solution, neutralizing the acid esterification catalyst with a 10 to 50% molar excess of a nitrogenous base selected from the group consisting of ammonia and amines free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

6. In a process for the production of lower aliphatic acid esters of cellulose, the steps which comprise esterifying cellulose with a lower aliphatic acid anhydride in the presence of perchloric acid and a water-immiscible solvent for the ester being formed whereby there will be obtained at the completion of the esterification a substantially homogeneous solution, ripening the organic acid ester of cellulose in the solution, neutralizing the perchloric acid with a nitrogenous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

7. In a process for the production of lower aliphatic acid esters of cellulose, the steps which comprise esterifying cellulose with a lower aliphatic acid anhydride in the presence of perchloric acid and a water-immiscible solvent for the ester being formed whereby there will be obtained at the completion of the esterification a substantially homogeneous solution, neutralizing the perchloric acid with a nitrogenous base free from interfering groups, subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution, and removing at least a portion of the water present in the extracted solution without precipitating the organic acid ester of cellulose from solution.

8. In a process for the production of lower aliphatic acid esters of cellulose, the steps which comprise esterifying cellulose with a lower aliphatic acid anhydride in the presence of perchloric acid and methylene chloride whereby there will be obtained at the completion of the esterification a substantially homogeneous solution, neutralizing the perchloric acid with a nitrogenous base free from interfering groups, and subjecting the solution to a two phase extraction with an aqueous medium to remove substantially all the water-soluble materials therefrom, there being present during the extraction a sufficient proportion of methylene chloride to prevent precipitation of the organic acid ester of cellulose from the solution.

9. In a process for the production of lower aliphatic acid esters of cellulose, the steps which comprise esterifying cellulose with a lower aliphatic acid anhydride in the presence of perchloric acid and a water-immiscible solvent for the ester being formed whereby there will be obtained at the completion of the esterification a substantially homogeneous solution, neutralizing the perchloric acid with a nitrogenous base free from interfering groups, subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution, and removing at least a portion of the water in the extracted solution by distillation whereby an azeotrope of water and methylene chloride will distill overhead without precipitating the organic acid ester of cellulose from solution.

10. In a process for the production of cellulose acetate, the steps which comprise esterifying cellulose with acetic anhydride in the presence of an acid esterification catalyst and a water-immiscible solvent for the ester being formed whereby there will be obtained at the completion of the esterification a substantially homogeneous solution, neutralizing the acid esterification catalyst with a nitrogenous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the cellulose acetate from the solution.

11. In a process for the production of cellulose acetate, the steps which comprise esterifying cellulose with acetic anhydride in the presence of an acid esterification catalyst and methylene chloride whereby there will be obtained at the completion of the esterification a substantially homogeneous solution, neutralizing the acid esterification catalyst with a nitrogenous base free from interfering groups, and subjecting the solution to a two phase extraction with an aqueous medium to remove substantially all the water-soluble materials therefrom, there being present during the extraction a sufficient proportion of methylene chloride to prevent precipitation of the cellulose acetate from the solution.

12. In a process for the production of cellulose acetate, the steps which comprise esterifying cellulose with acetic anhydride in the presence of a mineral acid esterification catalyst and a water-immiscible solvent for the ester being formed whereby there will be obtained at the completion of the esterification a substantially homogeneous solution, neutralizing the mineral acid esterification catalyst with a 10 to 50% molar excess of a nitrogenous base selected from the group consisting of ammonia and amines free from interfering groups, and subjecting the solution to a two phase extraction with an aqueous medium to remove substantially all the water-soluble materials therefrom, there being present during the extraction a sufficient proportion of water-immiscible solvent to prevent precipitation of the cellulose acetate from the solution.

13. In a process for the production of cellulose acetate, the steps which comprise esterifying cellulose with acetic anhydride in the presence of a mineral acid esterification catalyst and methylene chloride whereby there will be obtained at the completion of the esterification a substantially homogeneous solution, neutralizing the mineral acid esterification catalyst with a 10 to 50% molar excess of a nitrogenous base selected from the group consisting of ammonia and amines free from interfering groups, and subjecting the solution to a two phase extraction with an aqueous medium to remove substantially all the water-soluble materials therefrom, there being present during the extraction a sufficient proportion of methylene chloride to prevent precipitation of the cellulose acetate from the solution.

14. In a process for the production of cellulose acetate, the steps which comprise esterifying cellulose with an organic acid anhydride in the presence of perchloric acid and a water-immiscible chlorinated hydrocarbon solvent for the ester being formed whereby there will be obtained at the completion of the esterification a substantially homogeneous solution, neutralizing the perchloric acid with a nitrogenous base free from interfering groups, and subjecting the solution to a two phase extraction with an aqueous medium to remove substantially all the water-soluble materials therefrom, there being present during the extraction a sufficient proportion of water-immiscible solvent to prevent precipitation of the cellulose acetate from the solution.

15. In a process for the production of cellulose acetate, the steps which comprise esterifying cellulose with acetic anhydride in the presence of a mineral acid esterification catalyst and methylene chloride whereby there will be obtained at the completion of the esterification a substantially homogeneous solution, neutralizing the acid esterification catalyst with a 10 to 50% molar excess of a nitrogenous base selected from the group consisting of ammonia and amines free from interfering groups, subjecting the solution to a two phase extraction with an aqueous medium to remove substantially all the water-soluble materials therefrom, there being present during the extraction a sufficient proportion of methylene chloride to prevent precipitation of the cellulose acetate from the solution, and removing at least a portion of water in the extracted solution by distillation whereby an azeotrope of water and methylene chloride will distill overhead without precipitating the organic acid ester of cellulose from solution.

16. In a process for the production of lower aliphatic acid esters of cellulose the steps which comprise treating a solution of a lower aliphatic acid ester of cellulose in a water-immiscible solvent, said solution containing an acid esterification catalyst, with a nitrogenous base free from interfering groups to neutralize the acid esterification catalyst, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

17. In a process for the production of esters of cellulose with lower alkanoic acids containing up to 4 carbon atoms, the steps which comprise treating a solution of an ester of cellulose with a lower alkanoic acid containing up to 4 carbon atoms in a water-immiscible solvent, said solution containing perchloric acid, with a nitrogenous base free from interfering groups to neutralize the perchloric acid, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

18. In a process for the production of esters of cellulose with lower alkanoic acids containing up to 4 carbon atoms, the steps which comprise treating a solution of an ester of cellulose with a lower alkanoic acid containing up to 4 carbon atoms in a water-immiscible chlorinated hydrocarbon solvent, said solution containing perchloric acid, with a 10 to 50% molar excess of a nitrogenous base free from interfering groups to neutralize the perchloric acid, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

19. In a process for the production of esters of cellulose with lower alkanoic acids containing up to 4 carbon atoms, the steps which comprise treating a solution of an ester of cellulose with a lower alkanoic acid containing up to 4 carbon atoms in a water-immiscible chlorinated hydrocarbon solvent, said solution containing perchloric acid, with a nitrogenous base selected from the group consisting of ammonia and amines free from interfering groups to neutralize the perchloric acid, and subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution.

20. In a process for the production of cellulose acetate, the steps which comprise treating a solution of cellulose acetate in methylene chloride, said solution containing perchloric acid, with a 10 to 50% molar excess of a nitrogenous base selected from the group consisting of ammonia and amines free from interfering groups to neutralize the perchloric and, subjecting the solution to a two phase extraction with an aqueous medium to remove substantially all the water-soluble materials therefrom, there being present during the extraction a sufficient proportion of methylene chloride to prevent precipitation of the cellulose acetate from the solution.

21. In a process for the production of lower aliphatic acid esters of cellulose, the steps which comprise esterifying cellulose with a lower aliphatic acid anhydride in the presence of an acid esterification catalyst and a water-immiscible solvent for the ester being formed whereby there will be obtained at the completion of the esterification a substantially homogeneous solution, neutralizing the acid esterification catalyst with a nitrogenous base free from interfering groups, subjecting the solution to a two phase extraction with an aqueous medium to remove substantially all the water-soluble materials therefrom, there being present during the extraction a sufficient proportion of water-immiscible solvent to prevent precipitation of the organic acid ester of cellulose from the solution, and spinning the solution without any intermediate precipitation of the organic acid ester of cellulose from solution.

22. In a process for the production of cellulose acetate, the steps which comprise esterifying cellulose with acetic anhydride in the presence of perchloric acid and methylene chloride whereby there will be obtained at the completion of the esterification a substantially homogeneous solution, neutralizing the perchloric acid with a 10 to 50% molar excess of a nitrogenous base selected from the group consisting of ammonia and amines, subjecting the solution to a two phase extraction with an aqueous medium to remove substantially all the water-soluble materials therefrom, there being present during the extraction a sufficient proportion of methylene chloride to prevent precipitation of the cellulose acetate from the solution, and spinning the solution without any intermediate precipitation of the cellulose acetate from solution.

References Cited in the file of this patent
UNITED STATES PATENTS

| | | |
|---|---|---|
| 2,126,190 | Hofmann | Aug. 9, 1934 |
| 2,214,943 | Tinsley | Sept. 17, 1940 |
| 2,265,528 | Hofmann et al. | Dec. 9, 1941 |
| 2,536,634 | Fraizy et al. | Jan. 2, 1951 |